United States Patent [19]
Förster

[11] Patent Number: 5,738,191
[45] Date of Patent: Apr. 14, 1998

[54] VIBRATION DAMPER

[75] Inventor: Andreas Förster, Schweinfurt, Germany

[73] Assignee: Fichtel & Sachs AG, Schweinfurt, Germany

[21] Appl. No.: 628,522

[22] Filed: Apr. 5, 1996

[30] Foreign Application Priority Data

Apr. 6, 1995 [DE] Germany ............... 195 12 866.4

[51] Int. Cl.$^6$ ............... F16F 9/48; F16F 9/516; B60G 17/08
[52] U.S. Cl. ............... 188/318; 188/315; 188/322.19
[58] Field of Search ............... 188/318, 314, 188/315, 280, 281, 282, 322.13, 322.14, 322.15, 322.22, 298, 322.19, 299

[56] References Cited

U.S. PATENT DOCUMENTS

| | | | |
|---|---|---|---|
| 2,738,036 | 3/1956 | Crabtree . | |
| 4,266,639 | 5/1981 | Schloth . | |
| 4,971,180 | 11/1990 | Kobayashi et al. | 188/315 |

FOREIGN PATENT DOCUMENTS

| | | |
|---|---|---|
| 0322608 | 7/1989 | European Pat. Off. . |
| 0725199 | 9/1942 | Germany . |
| 1049643 | 7/1959 | Germany . |
| 1803588 | 5/1970 | Germany . |
| 3303293 | 1/1984 | Germany . |
| 4105771 | 8/1992 | Germany . |
| 4130870 | 3/1993 | Germany . |
| 4320446 | 2/1994 | Germany . |

*Primary Examiner*—Douglas C. Butler
*Attorney, Agent, or Firm*—Nils H. Ljungman and Associates

[57] ABSTRACT

A vibration damper having a pressure tube in which a piston with a piston rod is located so that the piston can move axially. The pressure tube is divided into upper and lower working chambers. The upper working chamber is connected by a hydraulic connection to the oil sump of an equalization chamber. The vibration damper also has at least one damping valve in the piston at least for the direction of flow from the upper working chamber to the lower working chamber, a port valve between a connection opening in the upper working chamber and the oil sump, a non-return valve in a bottom valve body which connects the lower working chamber with the equalization chamber and at least one additional damping valve in addition to the piston valve(s). In the insertion direction, the additional damping valve produces a damping which occurs as a function of the volume flow distribution. As a result of the flow resistances in the valves, there is a superimposed pressure damping of the valves, whereby a maximum of the displaced volume of the lower work chamber and a minimum of the volume displaced by the piston rod flows through the damping valve. The flow resistance inside the hydraulic connection in the direction of flow from the oil sump into the upper working chamber through a directionally-dependent port valve is less than in the opposite direction of flow.

20 Claims, 7 Drawing Sheets

VIBRATION DAMPER

BACKGROUND OF THE INVENTION

1. Field of the Invention

The present invention generally relates to a vibration damper.

2. Background Information

A similar vibration damper, for example, is disclosed in German Patent No. 33 03 293. That vibration damper includes, among other things, a pressure tube in which a piston with a piston rod is located so that it can move axially, and divides the pressure tube into an upper and a lower working chamber. The upper working chamber is connected by means of a hydraulic connection to an oil sump of an equalization chamber. Inside the piston there are damping valves for both directions of flow. Between a connection opening in the upper working chamber and the oil sump, the hydraulic connection has a controlled port valve. The port valve can be switched between two operating positions, and is opened by the pressure in the lower working chamber when the piston moves in the inward direction, and connects the upper working chamber with the oil sump. In the decompression direction, the port valve is moved into the closed position by means of a spring. The port valve is thereby located on the bottom of the vibration damper. The entire flow volume must flow through the piston in the decompression direction and in the compression direction. Correspondingly large flow cross sections must be realized in the piston, which necessarily results in relatively small webs on the piston or piston body cross sections, which have a negative effect on the strength of the piston body, in particular in the event of damping force peaks. An additional disadvantage is the special realization which is required for the port valve. The port valve consists of a valve plate (or seat) which moves axially between an open and a closed position, as a function of the pressure conditions in the lower working chamber. The axial movement in connection with the mass of the valve plate necessarily results in rattling noises which are practically impossible to control.

OBJECT OF THE INVENTION

One object of the invention is to make it possible to control the ratio of damping force of the decompression direction/compression direction as desired, whereby in the compression direction, cavitation can be prevented in the upper working chamber.

SUMMARY OF THE INVENTION

The invention teaches that this object can be accomplished if there is preferably at least one damping valve in addition to the piston valve(s), and in the entry direction, the damping valve causes a damping which is a function of the distribution of the volume flow as a result of the flow resistances in the valves, so that there is a superimposed pressure damping of the valves, whereby a maximum of the displaced volume of the lower working chamber and a minimum of the displaced volume of the piston rod flows through the damping valve, and the flow resistance inside the hydraulic connection is lower in the flow direction from the oil sump into the upper working chamber through a directionally-dependent port valve than in the opposite direction of flow.

The damping force in the compression direction can advantageously be designed to be very variable, since the bottom valve by itself, in the extreme case, can take over (or perform) the compression damping and the piston valve can take over (or perform) the decompression damping. Under these conditions, the piston can essentially even function as a displacer (or displacement piston), so that the entire volume of the lower working chamber is displaced by the bottom valve for the compression damping. Consequently, the flow cross sections of each of the damping valves need only be sized for one direction of flow. The directionally-dependent port valve prevents the occurrence of cavitation in the upper working chamber. Of course, this strict separation need not be observed, and any desired percentage of the volume of the lower working chamber can also be allowed to flow through the piston valve into the upper working chamber. In certain known vibration dampers, the lower limit of the damping medium flow through the piston during compression damping is defined by the occurrence of cavitation, whereby the cavitation essentially occurs because during the insertion movement of the piston, the upper working chamber expands into the pressure tube, and there is no reflux (or backflow or secondary flow) of damping medium which fills up this increased volume.

Moreover, the invention teaches that the hydraulic connection, starting from the connection opening, advantageously bypasses the pressure tube and ends directly in the oil sump. At the bottom valve, there is a significant cross section available for the damping valve in the compression direction.

In one embodiment, the hydraulic connection is preferably formed by the concentric arrangement of the pressure tube and an intermediate tube which surrounds the pressure tube, whereby the directionally-dependent port valve is located inside the circular-shaped hydraulic connection. Alternatively, the hydraulic connection can be formed by a tubular body which runs essentially parallel to the longitudinal axis of the vibration damper. It is thereby appropriate for reasons of cost to have the tubular body formed by a flexible hose. One advantage of this solution is that relatively little volume is required for the hydraulic connection, and in a two-tube damper in particular, the volume of oil in the equalization chamber is more favorable, given identical dimensions of the vibration damper.

It is also possible to realize several different variants of the directionally-dependent port valve. For example, it has been found to be effective if the directionally-dependent port valve is formed by a slotted ring which is fastened to the inside diameter of the pressure tube.

But the directionally-dependent port valve can also be formed by a spring washer which at least partly covers a channel in the piston rod guide. For example, the spring washer can be clamped between the pressure tube and the piston rod guide. In order that the spring washer can be installed securely and in a defined initial position, the spring washer can be centered on a radial guide of the piston rod guide.

In one advantageous realization, the directionally-dependent port valve consists of a constriction in the hydraulic connection with an axially movable valve body. The body which forms the hydraulic connection thereby performs the additional function that it is a component of the directionally-dependent port valve. In one consistent refinement, the constriction extends essentially over the entire length of the hydraulic connection to the connection opening. The advantage of this characteristic is that the operating pressure inside the hydraulic connection exerts a hydraulic support force on the bodies which form the hydraulic connection, whereby the hydraulic support force results from the product of the operating pressure and the projected area of the constriction.

Because the vibration damper preferably comprises a bottom valve with a bottom valve body, this bottom valve body advantageously extends, starting from the pressure tube, radially into the hydraulic connection, and is a component of the directionally-dependent port valve.

Because there is a current trend toward the increasing standardization of vibration dampers, the bottom valve body in the hydraulic connection can have an axial support surface on which a separate valve ring can be supported as a component of the directionally-dependent port valve. Optionally, the directionally-dependent port valve can be used or even omitted for any desired vibration damper, whereby essentially the same bottom valve body can always be used.

In connection with a constriction of the hydraulic connection, the intermediate tube can be mounted so that it floats axially, and is supported on the piston rod guide. In another model, the intermediate tube is fixed in position between the piston rod and a locking ring on the bottom of the vibration damper.

For a comfortable ride, the damping action is of major importance at damper velocities near zero. To achieve a soft initial portion of the damping force speed characteristic, port openings are selected which, however, are generally different in the decompression and compression direction. In the present realization it is possible to integrate this port opening for the decompression direction into the directionally-dependent port valve. The port opening for the characteristic curve in the compression direction is most advantageously located in the bottom valve. For example, the piston advantageously remains free of port openings for the initial portion of the characteristic which are located on the piston, and still work in the decompression and compression direction at no additional expense.

But if no particular port opening for the initial portion of the characteristic is necessary in the decompression direction, the directionally-dependent port valve can also be realized in the form of a non-return valve.

To achieve a strict separation between the damping in the compression and decompression directions, the directionally-dependent port valve can likewise be realized in the form of a non-return valve.

The valves in the piston and/or the bottom valve body can also be made adjustable.

In summary, one aspect of the invention resides broadly in a vibration damper, the vibration damper comprising a pressure tube having a longitudinal axis; a piston disposed within the pressure tube and dividing the pressure tube into a first working chamber and a second working chamber; the pressure tube having a first pressure tube end closing the first working chamber and a second pressure tube end closing the second working chamber; a piston rod connected to the piston and extending through the first working chamber and the first pressure tube end to a position exterior of the pressure tube; the piston being displaceable within the pressure tube along the longitudinal axis of the pressure tube; a hydraulic fluid contained in both of the first and second working chambers; equalization chamber means for containing a reservoir of the hydraulic fluid; first damping valve means provided on the piston for providing a first damped flow path through the piston at least from the first working chamber to the second working chamber; a first hydraulic connection between the first working chamber and the equalization chamber means; a port valve disposed in the first hydraulic connection between the first working chamber and the equalization chamber means, the port valve having a substantially greater resistance to flow through the first hydraulic connection in a direction from the first working chamber toward the equalization chamber means than to flow through the first hydraulic connection in a direction from the equalization chamber means toward the first working chamber; a second hydraulic connection between the second working chamber and the equalization chamber means; directional flow valve means positioned within the second hydraulic connection for permitting flow from the equalization chamber means to the second working chamber and for substantially restraining flow from the second working chamber to the equalization chamber means; a third hydraulic connection between the second working chamber and the equalization chamber means; and at least one additional damping valve means, the at least one additional damping valve means being positioned within the third hydraulic connection, the at least one additional damping valve means providing an additional damped flow path from the second working chamber to the equalization chamber means.

A further aspect of the invention resides broadly in a vibration damper, the vibration damper comprising a pressure tube having a longitudinal axis; a piston disposed within the pressure tube and dividing the pressure tube into a first working chamber and a second working chamber; the pressure tube having a first pressure tube end closing the first working chamber and a second pressure tube end closing the second working chamber; a piston rod connected to the piston and extending through the first working chamber and the first pressure tube end to a position exterior of the pressure tube; the piston being displaceable within the pressure tube along the longitudinal axis of the pressure tube; a hydraulic fluid contained in both of the first and second working chambers; equalization chamber means for containing a reservoir of the hydraulic fluid; first damping valve means provided on the piston for providing a first damped flow path through the piston at least from the first working chamber to said second working chamber; a first hydraulic connection between the first working chamber and the equalization chamber means; a port valve disposed in the first hydraulic connection between the first working chamber and the equalization chamber means, the port valve having a substantially greater resistance to flow through the first hydraulic connection in a direction from the first working chamber toward the equalization chamber means than to flow through the first hydraulic connection in a direction from the equalization chamber means toward the first working chamber; a second hydraulic connection between the second working chamber and the equalization chamber means; directional flow valve means positioned within the second hydraulic connection for permitting flow from the equalization chamber means to the second working chamber and for substantially restraining flow from the second working chamber to the equalization chamber means; a third hydraulic connection between the second working chamber and the equalization chamber means; and at least one additional damping valve means, the at least one additional damping valve means being positioned within the third hydraulic connection, the at least one additional damping valve means providing an additional damped flow path from the second working chamber to the equalization chamber means; the at least one additional damping valve means being dimensioned to provide a volumetric flow through the third hydraulic connection, upon the piston being advanced into the pressure tube so as to compress the hydraulic fluid contained in the lower working chamber, the volumetric flow ranging between a maximum volumetric flow equal to the volume of the hydraulic fluid displaced from the second working chamber by the advancement of the piston into the pressure tube, and a minimum volumetric flow equal to the volume of the hydraulic fluid displaced by the advancement of the piston rod into the pressure tube.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the embodiments illustrated in the accompanying figures, wherein.

DESCRIPTION OF THE PREFERRED EMBODIMENTS

Figure 1:
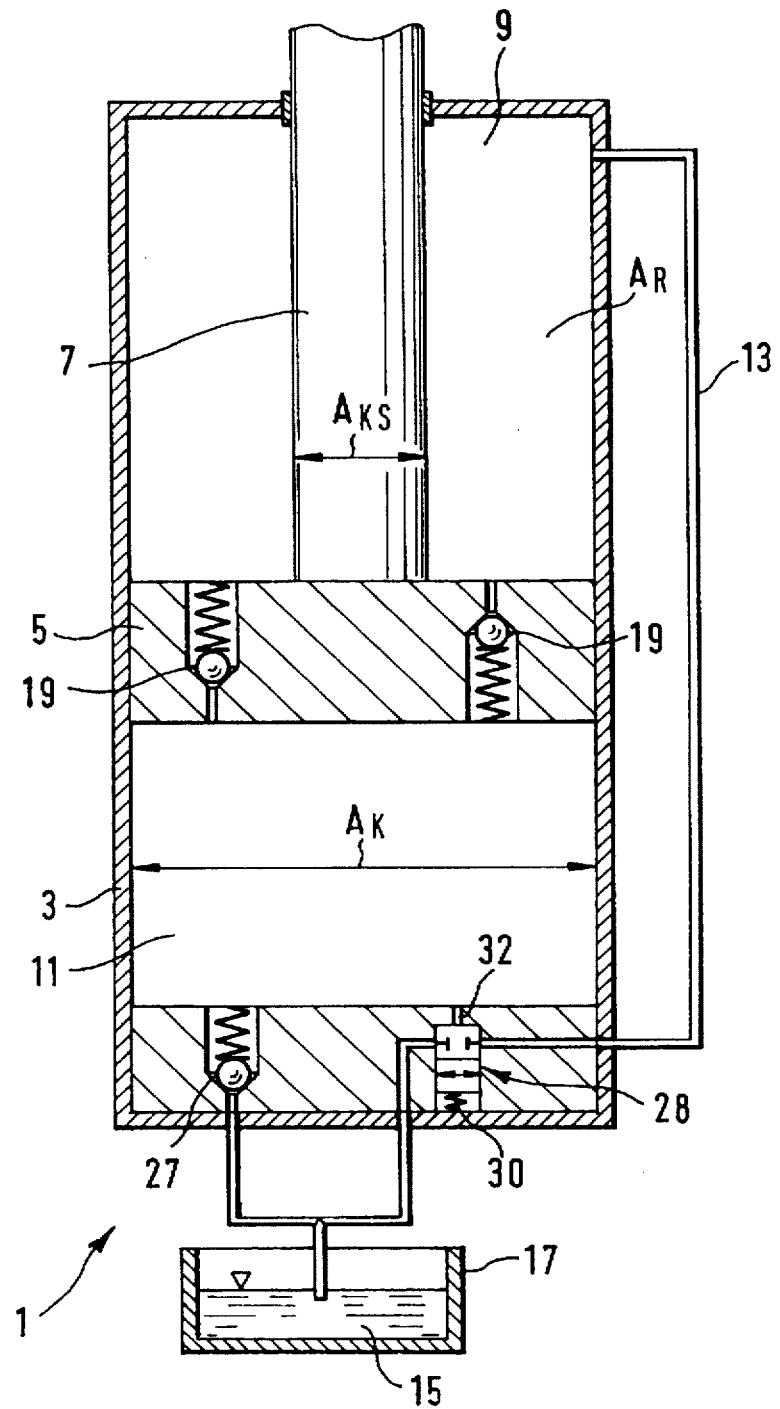
FIGS. 1 and 1A are schematic diagrams of the vibration damper discussed above.
Figure 1A:
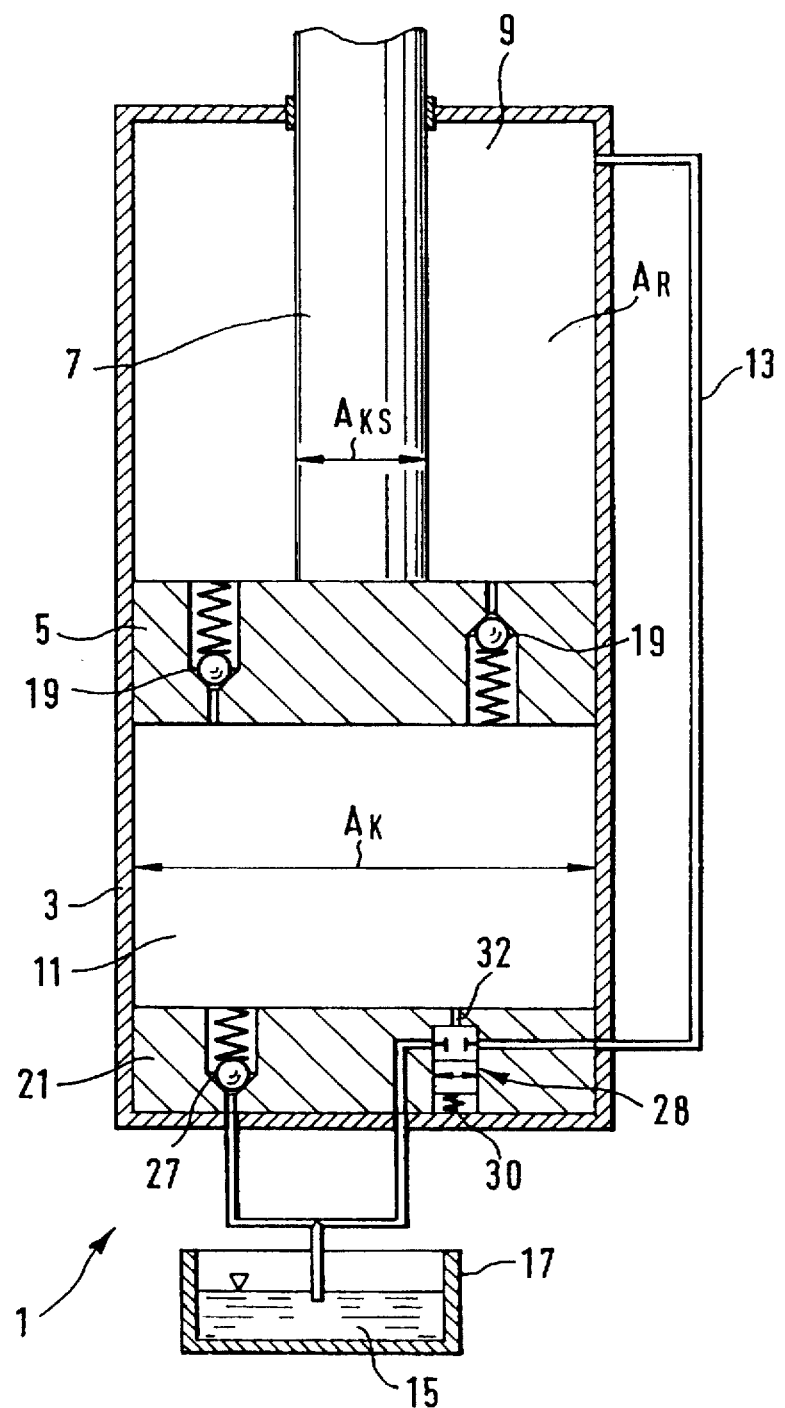

For a clearer understanding of the invention, the function of the vibration damper discussed above will first be described briefly. FIG. 1 shows very generally a vibration damper 1 with a pressure tube 3, in which a piston 5 on a piston rod 7 having the cross section $A_{KS}$ is located so that it can move axially, and divides the pressure tube into upper and lower working chambers 9 and 11, respectively. The upper working chamber 9 which has the cross section $A_R$ is in communication by means of a hydraulic connection 13 with an oil sump 15 of an equalization chamber 17. In addition, the upper and lower working chambers 9 and 11, respectively, are connected with one another by means of at least one damping valve 19 for the decompression and the compression directions in the piston 5. The lower end (or closure) of the lower working chamber 11 which has the cross section $A_K$ is formed by a bottom valve body 21 (see FIG. 1A) with a non-return valve 27 which, when the piston moves in the decompression direction, connects the oil sump 15 of the equalization chamber 17 with the lower working chamber 11. The hydraulic connection 13 is also equipped with a port valve 28. This port valve 28 is a 3/2-way valve actuated by the pressure of the working chamber 11, which 3/2-way valve, in the insertion or compression direction, is moved by the pressure inside the working chamber 11 into the open position, and by a spring 30 into the closed position during a decompression (e.g., upward) movement of the piston 5.

In the event of a piston movement in the decompression direction, there is necessarily a pressure gradient between the upper working chamber 9 and the lower working chamber 11. The relatively low pressure in the lower working chamber 11 in conjunction with the spring 30 moves the port valve 28 into the closed position, with the effect that the hydraulic connection 13 is separated from the working chambers. The overall volume flow $V_R$, which is the product of the cross section $A_R$ of the upper working chamber 9 multiplied by the piston velocity v, must flow through at least one of the piston valves 19. The volume of the lower working chamber 11 is necessarily larger than the volume of the upper working chamber 9 by the volume of the piston rod 7 which remains in the upper working chamber 9. Consequently, a volume flow $Q_{27}$, which corresponds to the exiting piston rod 7 cross section $A_{KS}$ multiplied by the piston rod 7 velocity, must flow through the non-return valve 27, out of the oil sump 15, and into the lower working chamber 11.

In the compression or insertion direction of the piston rod, a pressure accumulates in the lower working chamber 11 which opens the port valve 28 by means of a control line (or port) 32. Thus, the upper working chamber 9 is connected by means of the hydraulic connection 13 with the oil sump 15. Simultaneously, the non-return valve 27 closes. The total volume flow $Q_K=(A_K*v)$ is displaced through the valve 19 into the upper working chamber 9, which is smaller than the lower working chamber 11 by the instantaneous volume of the piston rod 7. Consequently, a volume flow $Q_{13}$ flows through the opened port valve 28 via the hydraulic connection 13 into the oil sump 15, which equals the product $A_{KS}$ of the incoming piston rod 7 multiplied by the piston velocity v. Consequently it is necessary, in particular for the compression damping, to provide a rather large flow cross section, so that even smaller damping forces can be realized. Otherwise, on account of the pressure actuation of the port valve 28, there is the problem that the port cross section is always a function of the pressure in the lower working chamber, with the result that the backflow (or secondary flow) volume is also a function of the pressure.

Figure 2:
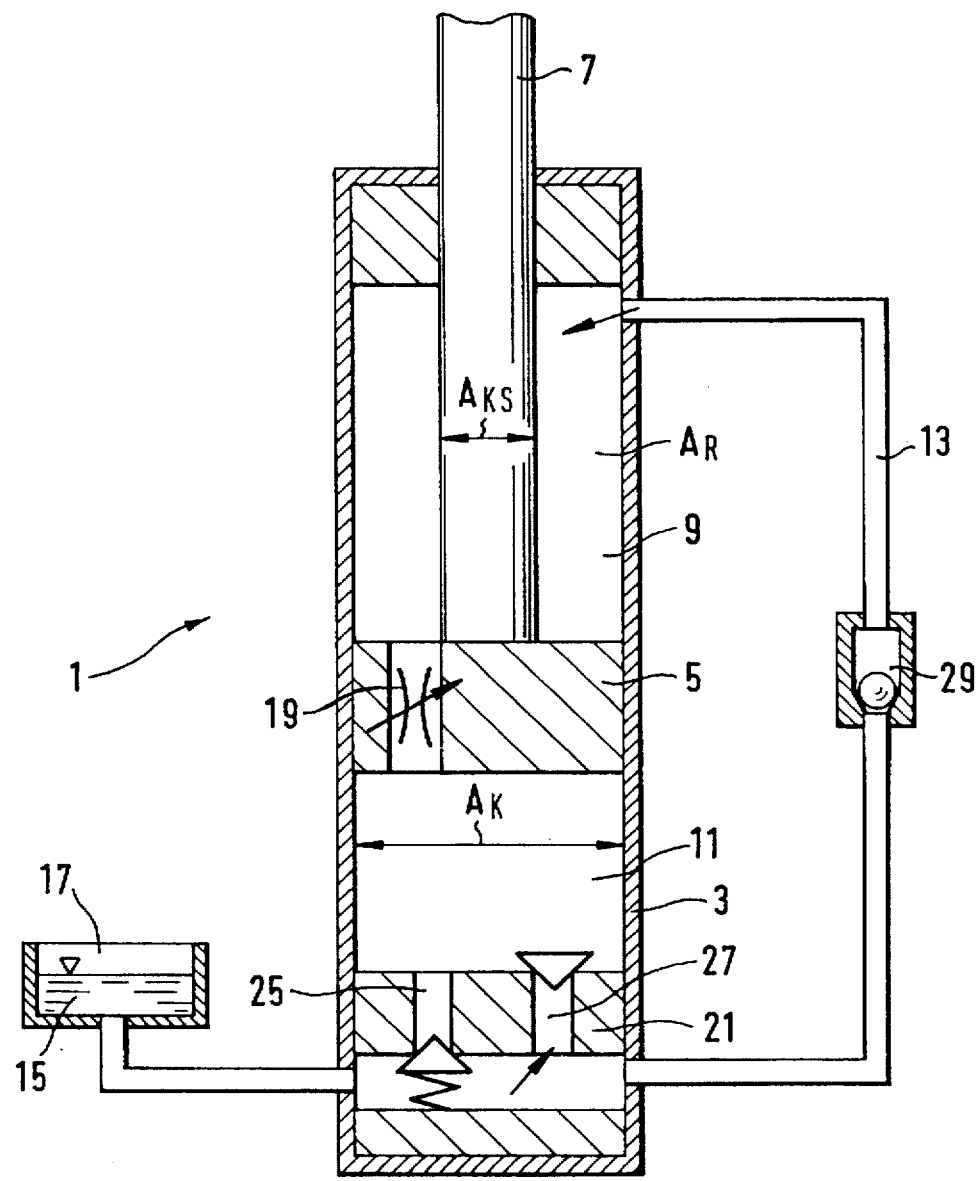
FIG. 2 is schematic diagram of a vibration damper constructed according to the invention.

FIG. 2 shows, in a general schematic form, a vibration damper 1 constructed according to the invention, with the pressure tube 3 in which the piston 5 is located so that it can move axially with the piston rod 7 which has the cross section $A_{KS}$, which piston 5 divides the pressure tube into the upper and lower working chambers 9 and 11 respectively. The upper working chamber 9 which has a cross section $A_R$ is connected by means of the hydraulic connection 13 to the oil sump 15 of an equalization chamber 17. Moreover, the two working chambers 9 and 11 are connected to one another by means of at least one damping valve 19 at least for the decompression direction, but preferably for both the decompression and the compression direction, the at least one damping valve 19 providing a flow path through the piston 5. The bottom closure of the lower working chamber 11 which has the cross section $A_K$ is formed by a bottom valve body 21, which is provided with an additional damping valve 25 and a non-return valve 27, whereby the non-return valve 27 connects the oil sump 15 of the equalization chamber 17 with the lower working chamber 11 in the event of a piston movement in the decompression direction. A port valve 29 is positioned within the hydraulic connection 13. The port valve 29 can very generally be realized in the form of a directionally-dependent port valve 29 with two different port cross sections (i.e., with a substantially greater resistance to flow in one direction than in the opposite direction), or as a non-return valve.

For purposes of discussion, let it initially be assumed that the port valve 29 is realized in the form of a non-return valve. When there is a movement of the piston rod 7 in the decompression direction, the entire volume displaced flows out of the upper working chamber 9 as $Q_{AR}$ through the piston valve 19, since the non-return valve 29 is closed. The oil sump 15 is separated from the upper working chamber 11, so that there is no possibility for a discharge of the displaced volume by bypassing the piston valve. Simultaneously, the volume of the extended (i.e., the outgoing) piston rod volume flows back into the lower working chamber 11 by means of the non-return valve 27 in the bottom valve body 21.

In contrast to the prior art as described above, in the compression direction the volume to be displaced ($A_K^*v$) is divided into a volume flow $Q_{25}$ of the additional damping valve 25 and a volume flow $Q_{19}$ through the piston valve 19 into the upper working chamber 11.

$$A_K^*v = Q_{19} + Q_{25} \qquad (I)$$

The upper working chamber 9, having the cross section $A_R$, which becomes larger with the velocity v of the piston, is filled up through the opened port valve 29 with the volume flow $Q_{29}$ by means of the hydraulic connection 13 from the oil sump 15.

$$A_R^*v = Q_{19} + Q_{29} \qquad (II)$$

It is known that $$A_{KS}^*v + A_R^*v = A_K^*v \qquad (III)$$

By putting Equations (I) and (II) in Equation (III), it can be shown that the volume flow $$Q_{25} = A_{KS}^*v + Q_{29} \qquad (IV)$$

flows through the additional damping valve 25. That results in the design of the bottom valve, because in the reverse direction of flow, the bottom valve allows less than the quantity calculated in Equation (IV) through, as a result of the overflow of damping medium in the upper working chamber into the hydraulic connection, the port valve 29 closes, whereby the absolute extreme case is $$Q_{25} = A_{KS}^*v$$

In other words, at least the volume of the incoming piston rod 7 must be displaced through the additional damping valve 25, on account of the volume relationships between the upper working chamber 9 and the lower working chamber 11.

The schematic diagram of FIG. 2 is not limited to exclusively two-tube dampers, but can also be used in single-tube dampers in connection with a bottom valve to (or for) the equalization chamber 17. It is not necessary to realize equalization chamber 17 directly on the vibration damper. With regard to the hydraulic connection 13, tube bodies can be in rigid or flexible form, e.g., in the form of a hose. It is essential that the hydraulic connection 13 bypasses the bottom valve, so that only the non-return valve 27 and the damping valve 25 have to be located in the bottom valve.

The directionally-dependent port valve 29 need not necessarily be realized in the form of a non-return valve. It is also appropriate to employ constructions wherein there is no throttling in the insertion direction of the piston, and wherein there is a significant throttling inside the directionally-dependent port valve 29 in the decompression direction. A series connection is thereby created, comprising the piston valve 19 and the port valve 29. In particular, in adjustable piston valves, the result of Equation (IV) shows that the volume flow $Q_{25}$, as a result of a very small throttle cross section, or in the other extreme case, when $Q_{19}$ is equal to zero, i.e., a hydraulically tight piston, makes possible a very great variability in the adjustment of the compression damping, without the danger of cavitation, which is controlled by the volume flow $Q_{29}$ from the oil sump 15 into the upper working chamber 9. In short:

$$A_{KS}^*v \leq Q_{25} \leq A_K^*v$$

If we assume that we are dealing with a conventional vibration damper without an adjustable damping force, the extreme case $A_{KS}^*v$ is of no interest, since essentially no cavitation can occur.

Figure 3A:
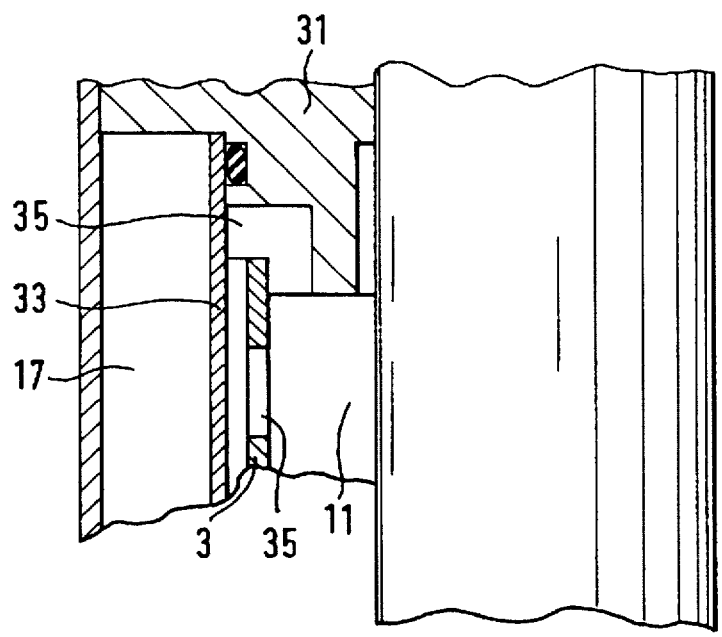
FIGS. 3A, 3B, 3C, 4A, 4B, 5, 6 and 7 illustrate details of various embodiments of the inventive vibration damper.
Figure 5:
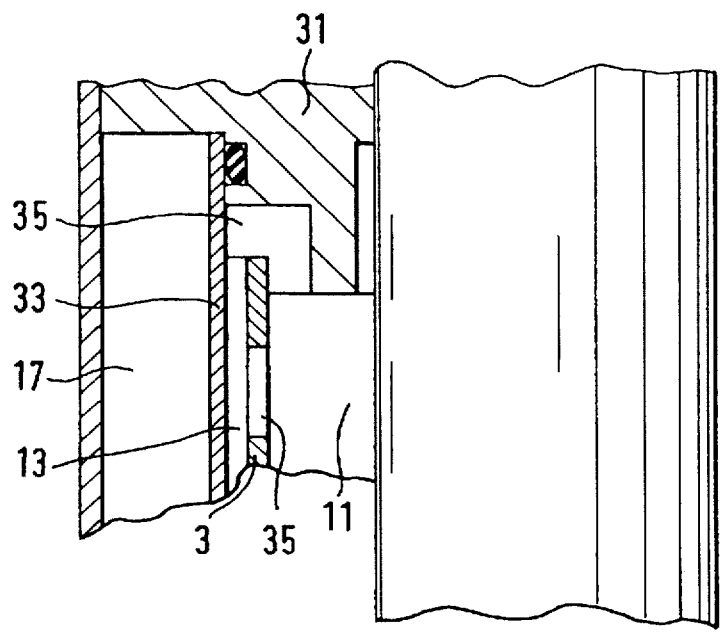

FIG. 3A illustrates one embodiment of the end of the upper working chamber 9, which is formed by a piston rod guide 31. In this embodiment, the illustrated vibration damper 1 is in the form of a two-tube damper. Concentric to the pressure tube 3 there is an intermediate tube 33 which surrounds the pressure tube 3 and together with the pressure tube 3 forms the hydraulic connection 13 (see FIG. 5) to the equalization chamber 17. The hydraulic connection begins at a connection opening 35, which can optionally be realized in the form of a channel in the piston rod guide and/or in combination with openings in the pressure tube 3. One preferable requirement is that the connection opening 35 has a cross section which does not produce any throttling effects. Therefore, even a plurality of connection openings 35 can be employed.

Figure 3B:
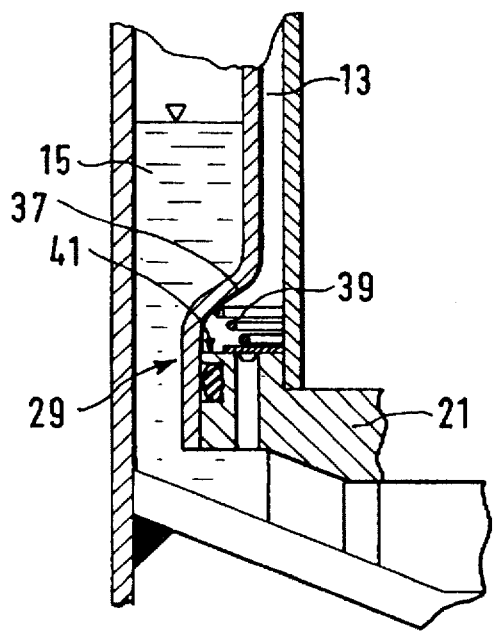
Figure 6:
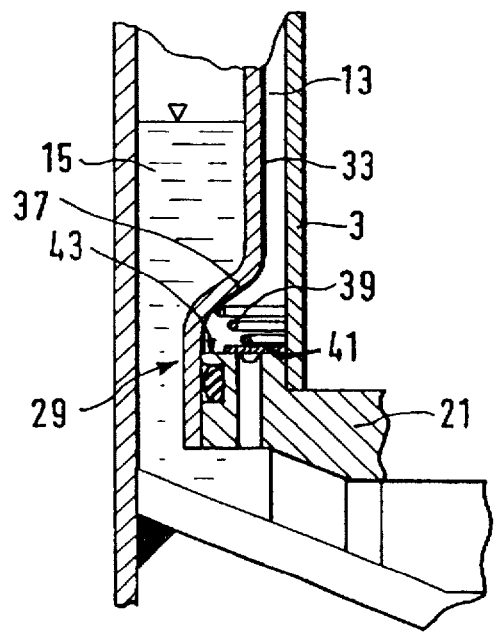

FIG. 3B is an illustration of one embodiment of the end of the hydraulic connection 13 immediately ahead of the entrance into the oil sump 15. The intermediate tube 33 (see FIG. 6) used contains a constriction 37 of the cross section which acts as a support for a closing spring 39. The closing spring 39 applies a bias force to a valve plate (or gate) 41 (see FIG. 6) which forms a valve body on a valve seat 43 (see FIG. 6), which is a component of a radially extended portion of the bottom valve body 21. In this realization, the constriction 37 extends over essentially the entire length of the hydraulic connection 13 up to the connection opening 35. The area of the projected cross section of the constriction 37 multiplied by the operating pressure inside the hydraulic connection 13 represents a hydraulic compression force which is supported on the bottom valve body 21 and forces the intermediate tube 33 toward the piston rod guide 31. Consequently, the intermediate tube 33 can also be mounted in a floating manner, which means that tolerances regarding the length of the intermediate tube 33 are essentially irrelevant (or at least minimized). An additional advantage is that the valve plate 41 requires only a small bias applied by the closing spring 39. The operating pressure inside the lower working chamber 11 plays practically no role in the opening behavior of the port valve 29.

Figure 3C:
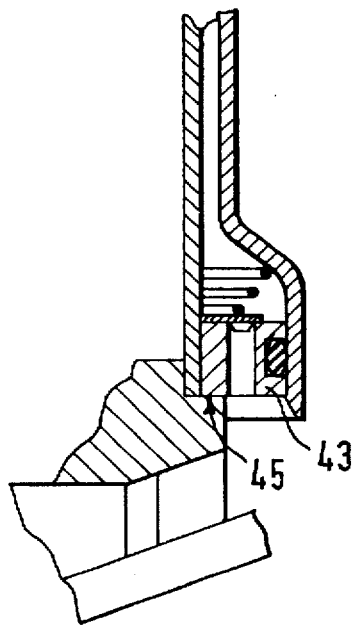

FIG. 3C shows a variant of the embodiment illustrated in FIG. 3B. The constructive difference is that the directionally-dependent port valve 29 has a valve ring 43 which is supported on a support surface 45 formed by the bottom valve body 21.

Figure 4A:
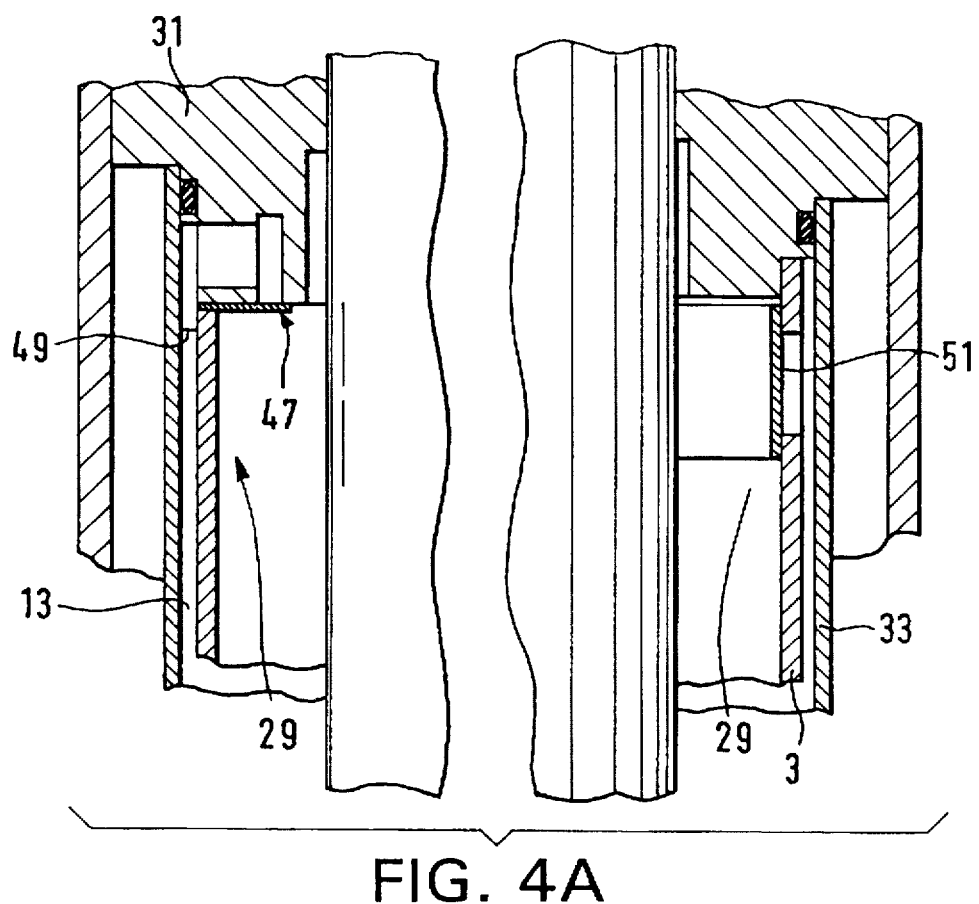
Figure 7:
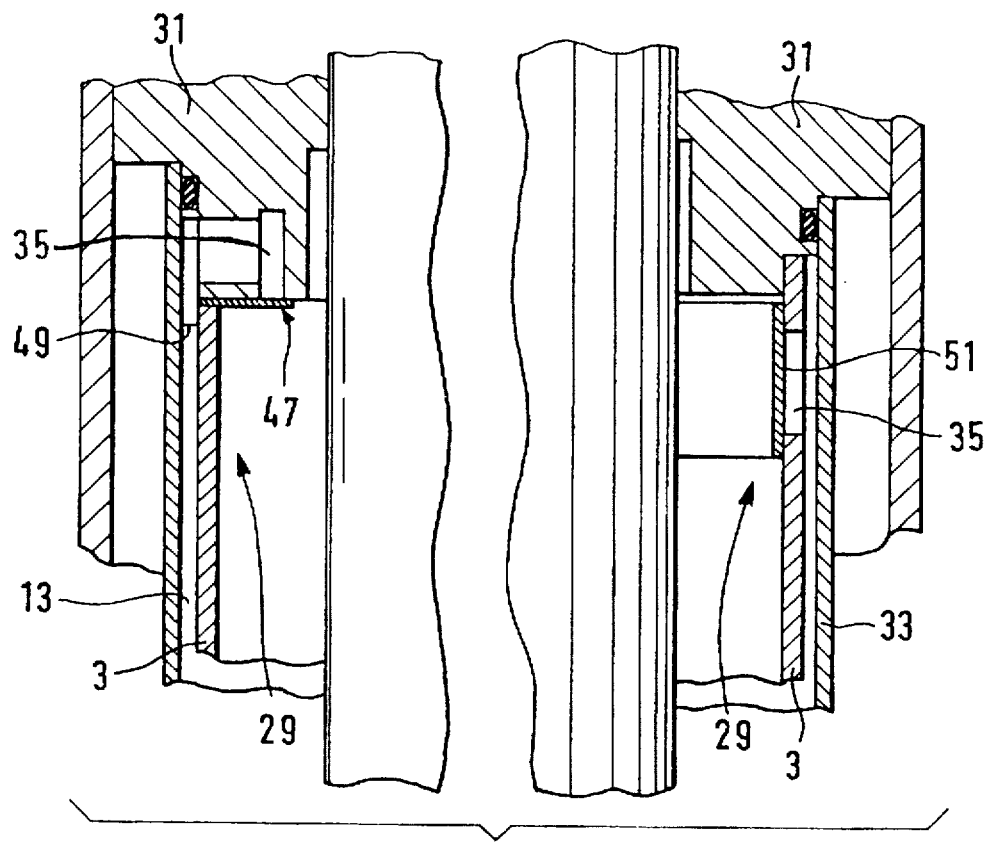

FIG. 4A illustrates two variants for the directionally-dependent port valve 29. In the left half of the figure, a spring washer 47 is used, which is centered radially on a radial guide 49. Axially, the spring washer 47 is braced (or clamped) between the pressure tube 3 and the piston rod guide 31. In the inflow direction from the hydraulic connection 13, the spring washer lifts up from the piston rod guide 31 and releases the full cross section of the connection opening 35 (see FIG. 7). In the reverse direction, depending on the layout of the cross section of the spring washer, e.g., by means of notches cut into the spring washer 47, the entire connection opening 35 or a portion of the opening can be covered by the spring washer 47.

Figure 4B:
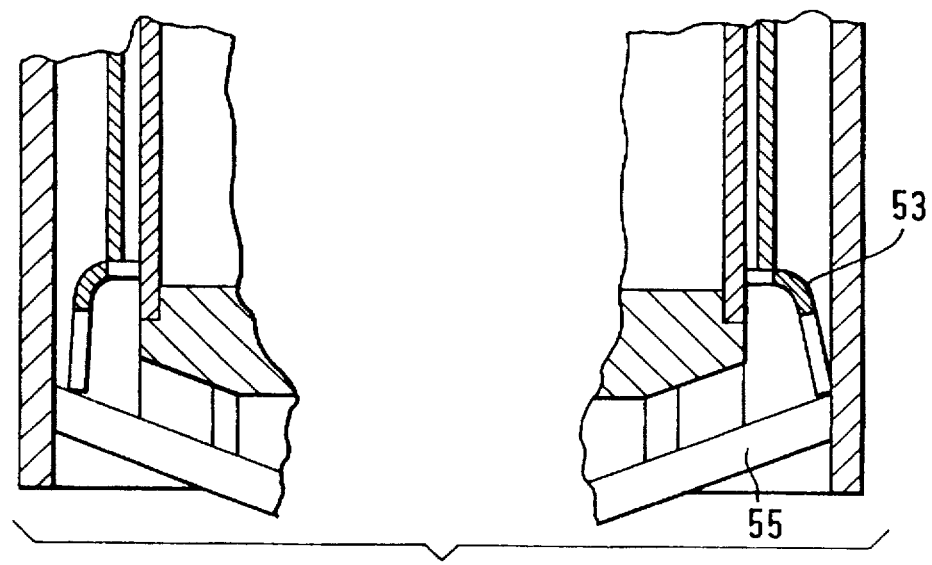

In the right half of FIG. 4A, a slotted ring 51 is used for the directionally-dependent port valve 29. The slotted ring 51 can be fastened in any desired manner to the inside of the pressure tube 3. For example, in order that the ring 51 lifts relatively easily, and nevertheless does not leave its position underneath the piston rod guide, a fastening rivet could also be used. The rivet opening required is in this case realized from the inside of the pressure tube 3 toward the outside, to place the inevitable cutout not in the seat area of the ring 51. One embodiment which can be used in conjunction with either of FIG. 4A is shown in FIG. 4B, wherein the intermediate tube 33 is not provided with a constriction and therefore cannot exert any hydraulic retaining force. Therefore, the intermediate tube 33 is braced between the underside of the piston rod guide 31 and a locking ring 53, whereby the locking ring 53 is in turn braced on a bottom closure 55 of the vibration damper.

During assembly, the locking ring 53 is inserted into the vibration damper. Then the intermediate tube 33 is introduced, and a bias is applied to the intermediate tube 33 by means of the piston rod guide 31, whereby the locking ring 53 is deformed and reliably retains the intermediate tube 33.

Referring again to the right half of FIG. 4A, the embodiment illustrated therein utilizes a slotted ring 51 positioned within the pressure tube 3 and in contact with the interior wall thereof. The slotted ring 51 may, in one embodiment of the invention, be formed of an elastomeric material, such a rubber or the like, and be provided with cuts extending partially from the lower edge vertically toward the upper edge of the ring. When such a slotted ring 51 is placed in contact with the interior wall of the pressure tube 3 so as to cover either a single connection opening 35 (see FIG. 7) or a series of connection openings 35, a one way non-return (or check) valve 29 is formed, since the resulting flaps of the slotted ring 51 will be free to deform inward to allow flow into the upper working chamber 9 through the connection opening(s) 35 during a downstroke of the piston 5, but will be pressed against the interior wall of the pressure tube 3 by hydraulic pressure formed in the upper working chamber 9 during an upstroke of the piston 5 thereby substantially restraining any flow from the upper working chamber 9 into the hydraulic connection 13 during the upstroke.

Alternatively, the slotted ring 51 may, in another embodiment of the invention, have not merely partially extending cuts proceeding from the bottom edge of the ring 51 toward the top edge of the ring 51, but may have gaps in place of the cuts, thereby forming a sawtoothed (or toothed) bottom edge of the ring 51. Here, during a downstroke of the piston 5, the slotted ring 51 performs substantially as described above, with the downwardly extending tooth portions of the ring 51 flexing easily away from the connection opening(s) 35 and permitting flow into the upper working chamber 9. In contrast, however, some flow may be permitted from the upper chamber 9 into the hydraulic connection 13 during an upstroke of the piston 5, due to the gaps between the downwardly projecting teeth of the ring 51 causing only part of the connection opening(s) 35 to be covered.

Other configurations are also possible. For example, the ring 51 could be provided with interior slits or holes encircling its periphery to achieve similar results to the two embodiments discussed respectively above.

Referring back to FIG. 2, the non-return valve 27 is essentially a check valve allowing flow in only one direction. Additionally, as noted above, in one embodiment of the invention, the directionally-dependent port valve 29 may also be configured as a non-return (or check) valve. Some examples of non-return (or check) valves which may be used for the non-return valve 27 and/or the directionally-dependent port valve 29 are to be found in the following U.S. patents, all of which are hereby expressly incorporated by reference herein:

U.S. Pat. No. 5,386,892, issued to Ashiba on Feb. 7, 1995 and entitled "Hydraulic shock absorber with shutters"; U.S. Pat. No. 5,404,973, issued to Katoh et al. on Apr. 11, 1995 and entitled "Damping force control type hydraulic shock absorber"; U.S. Pat. No. 5,431,259, issued to Mizutani et al. on Jul. 11, 1995 and entitled "Damping force control type hydraulic shock absorber"; U.S. Pat. No. 5,467,851, issued to Handke et al. on Nov. 21, 1995 and entitled "Shock absorber with a check valve module and a check valve module for a shock absorber"; and U.S. Pat. No. 5,474,371, issued to Shinomiya on Dec. 12, 1995 and entitled "Diagonal braking circuit with parallel throttle and check valve".

In contrast, still referring to FIG. 2, the damping valve 19 which passes through the piston 5 and the additional damping valve 25 are, in many embodiments of the invention, actual damping valves, which operate not only as one way valves, but which additionally supply some resistance to the flow in the permitted direction, the resistance determining, at least in part, the damping characteristics of the device. Some examples of damping valves which may be used in conjunction with the present invention are to be found in the following U.S. patents, all of which are hereby expressly incorporated by reference herein:

U.S. Pat. No. 5,392,885, issued to Patzenhauer et al. on Feb. 28, 1995 and entitled "Adjustable hydraulic vibration damper for motor vehicles"; U.S. Pat. No. 5,443,309, issued to Beck on Aug. 22, 1995 and entitled "Solenoid valve, in particular for hydraulic brake systems with slip control"; U.S. Pat. No. 5,445,401, issued to Bradbury on Aug. 29, 1995 and entitled "Suspension fork for bicycles"; and U.S. Pat. No. 5,458,218, issued to Runkel on Oct. 17, 1995 and entitled "Suspension system for motor vehicles as well as damping valve for said suspension system".

Even more particularly, the damping valve 19 which in FIG. 2 passes through the piston 5 may, in one embodiment of the invention, be configured as a variable damping valve, the resistance to flow in one or both directions therethrough being adjustable. Some examples of variable damping valves which may be used in conjunction with the present invention are to be found in the following U.S. patents, all of which are hereby expressly incorporated by reference herein:

U.S. Pat. No. 5,392,885, issued to Patzenhauer et al. on Feb. 28, 1995 and entitled "Adjustable hydraulic vibration damper for motor vehicles"; U.S. Pat. No. 5,301,776, issued to Beck on Apr. 12, 1994 and entitled "Hydraulic adjustable vibration damper"; and U.S. Pat. No. 5,207,300, issued to Engel et al. on May 4, 1993 and entitled "Hydraulic, adjustable vibration damper for motor vehicles".

Some examples of vibration damping device employing multiple concentric tube constructions with equalization chambers are to be found in the following U.S. patents, all of which are hereby expressly incorporated by reference herein:

U.S. Pat. No. 5,062,616, issued to Sommer on Nov. 5, 1991 and entitled "Self-pumping hydropneumatic shock absorbing strut"; and U.S. Pat. No. 4,993,693, issued to Löhr et al. on Feb. 19, 1991 and entitled "Self-pumping hydropneumatic shock absorbing leg with internal level regulation".

Additional examples of vibration damper features are to be found in the following U.S. patents, all of which are hereby expressly incorporated by reference herein:

U.S. Pat. No. 3,148,871, issued to Wilkens et al. in September 1964; U.S. Pat. No. 3,480,269, issued to Jewell et al. in November 1969; U.S. Pat. No. 3,536,312, issued to Lohr in October 1970; U.S. Pat. No. 3,593,978, issued to Lohr in July 1971; U.S. Pat. No. 4,105,194, issued to Smeltzer et al. in August 1978; U.S. Pat. No. 4,445,673, issued to Clark in May 1984; U.S. Pat. No. 4,469,315, issued to Nicholls et al. in September 1984; U.S. Pat. No. 4,577,840, issued to Meller et al. in March 1986; U.S. Pat. No. 4,650,042, issued to Knecht et al. in March 1987; U.S. Pat. No. 4,700,812, issued to Moser in October 1987; U.S. Pat. No. 4,723,640, issued to Beck in February 1988; U.S. Pat. No. 4,749,069, issued to Knecht et al. in June 1988; U.S. Pat. No. 4,749,070, issued to Moser et al. in June 1988; U.S. Pat. No. 4,785,920, issued to Knecht et al. in November 1988; and U.S. Pat. No. 4,800,995, issued to Bernhardt et al. in January 1989.

One feature of the invention resides broadly in the vibration damper comprising a pressure tube in which a piston with a piston rod is located so that it can move axially, and the pressure tube is divided into an upper and a lower working chamber, whereby the upper working chamber is connected by means of a hydraulic connection to the oil sump (or oil pan) of an equalization chamber, at least one damping valve at least for the direction of flow from the upper working chamber to the lower working chamber in the piston, a port valve between a connection opening in the upper working chamber and the oil sump, a non-return valve in a bottom valve body which connects the lower working chamber with the equalization chamber, characterized by the fact that there is also at least one damping valve 25 in addition to the piston valve(s) 19, and in the insertion direction, the damping valve 25 produces a damping which occurs as a function of the volume flow distribution as a result of the flow resistances in the valves 19; 25, so that there is a superimposed pressure damping of the valves 19; 25, whereby a maximum of the displaced volume of the lower work chamber 11 and a minimum of the volume displaced by the piston rod 5 flows through the damping valve 25, and the flow resistance inside the hydraulic connection 13 in the direction of flow from the oil sump 15 into the upper working chamber 9 through a directionally-dependent port valve 29 is less than in the opposite direction of flow.

Another feature of the invention resides broadly in the vibration damper characterized by the fact that the hydraulic connection 13, starting from the connection opening(s), bypasses the pressure tube 3 and ends directly in the oil sump 15.

Yet another feature of the invention resides broadly in the vibration damper characterized by the fact that the hydraulic connection is formed by the concentric arrangement of the pressure tube and an intermediate tube 33 which surrounds the pressure tube, whereby the directionally-dependent port valve 29 is located inside the circular-shaped hydraulic connection.

Still another feature of the invention resides broadly in the vibration damper characterized by the fact that the hydraulic connection is formed by a tubular body, which runs essentially parallel to the longitudinal axis of the vibration damper.

A further feature of the invention resides broadly in the vibration damper characterized by the fact that the tubular body is formed by a flexible hose.

Another feature of the invention resides broadly in the vibration damper characterized by the fact that the directionally-dependent port valve 29 is formed by a slotted ring 51 which is fastened to the inside diameter of the pressure tube.

Yet another feature of the invention resides broadly in the vibration damper characterized by the fact that the directionally-dependent port valve 29 is formed by a spring washer 47 which at least partly covers a channel in the piston rod guide 31.

Still another feature of the invention resides broadly in the vibration damper characterized by the fact that the spring washer is clamped between the pressure tube and the piston rod guide.

A further feature of the invention resides broadly in the vibration damper characterized by the fact that the spring washer is centered on a radial guide 49 of the piston rod guide 31.

Another feature of the invention resides broadly in the vibration damper characterized by the fact that the directionally-dependent port valve 29 consists of a constriction 37 in the hydraulic connection 13 with an axially movable valve body 41.

Yet another feature of the invention resides broadly in the vibration damper characterized by the fact that the constriction extends essentially over the entire length of the hydraulic connection to the connection opening 35.

Still another feature of the invention resides broadly in the vibration damper characterized by the fact that the bottom valve body 21, starting from the pressure tube 3, extends radially into the hydraulic connection 13 and is a component of the directionally-dependent port valve 29.

A further feature of the invention resides broadly in the vibration damper characterized by the fact that the bottom valve body in the hydraulic connection has an axial support surface 45 on which a separate valve ring 43 is supported as a component of the directionally-dependent port valve 29.

Another feature of the invention resides broadly in the vibration damper characterized by the fact that the intermediate tube 33 is mounted so that it floats axially, and is supported on the piston rod guide 31.

Yet another feature of the invention resides broadly in the vibration damper characterized by the fact that the intermediate tube 33 is fixed in place between the piston rod guide 31 and a locking ring 53 on the base 55 of the vibration damper 1.

Still another feature of the invention resides broadly in the vibration damper characterized by the fact that the directionally-dependent port valve is realized in the form of a non-return valve.

A further feature of the invention resides broadly in the vibration damper characterized by the fact that the valves in the piston 5 and/or bottom valve bodies 21 are adjustable.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper, said vibration damper comprising:
   a pressure tube having a longitudinal axis;
   a piston disposed within said pressure tube and dividing said pressure tube into a first working chamber and a second working chamber;
   said pressure tube having a first pressure tube end closing said first working chamber and a second pressure tube end closing said second working chamber;

a piston rod connected to said piston and extending through said first working chamber and said first pressure tube end to a position exterior of said pressure tube;

said piston being displaceable within said pressure tube along said longitudinal axis of said pressure tube;

a hydraulic fluid contained in both of said first and second working chambers;

an equalization chamber for containing a reservoir of said hydraulic fluid;

a first damping valve arrangement provided on said piston for providing a first damped flow path through said piston at least from said first working chamber to said second working chamber;

an intermediate tube;

said intermediate tube being disposed substantially concentric to said pressure tube;

a first hydraulic connection between said first working chamber and said equalization chamber;

said first hydraulic connection comprising a passageway for said hydraulic fluid;

said intermediate tube and said pressure tube being disposed to form a space;

said passageway of said first hydraulic connection comprising said space formed by said intermediate tube and said pressure tube;

a port valve disposed in said first hydraulic connection between said first working chamber and said equalization chamber, said port valve having a substantially greater resistance to flow through said first hydraulic connection in a direction from said first working chamber toward said equalization chamber than to flow through said first hydraulic connection in a direction from said equalization chamber toward said first working chamber;

said port valve being disposed to form at least a part of a wall of said space;

a second hydraulic connection between said second working chamber and said equalization chamber;

a directional flow valve arrangement positioned within said second hydraulic connection for permitting flow from said equalization chamber to said second working chamber and for substantially restraining flow from said second working chamber to said equalization chamber;

a third hydraulic connection between said second working chamber and said equalization chamber; and at least one additional damping valve arrangement, said at least one additional damping valve arrangement being positioned within said third hydraulic connection, said at least one additional damping valve arrangement providing an additional damped flow path from said second working chamber to said equalization chamber.

2. A vibration damper according to claim 1, wherein said at least one additional damping valve arrangement comprises an apparatus for providing a flow through said third hydraulic connection, upon said piston being advanced into said pressure tube so as to compress said hydraulic fluid contained in said second working chamber; said apparatus for providing a flow through said third hydraulic connection is configured to provide a volumetric flow ranging between:

a maximum volumetric flow equal to the volume of said hydraulic fluid displaced from said second working chamber by said advancement of said piston into said pressure tube; and a minimum volumetric flow equal to the volume of said hydraulic fluid displaced by said advancement of said piston rod into said pressure tube.

3. A vibration damper according to claim 2, wherein said vibration damper additionally comprises at least one connection opening in said pressure tube connecting said first hydraulic connection with said first working chamber, and wherein said first hydraulic connection extends from said at least one connection opening to said equalization chamber external to said pressure tube.

4. A vibration damper according to claim 3, wherein said port valve comprises a constriction in said first hydraulic connection and a valve member, said valve member being displaceable along the axis of said first hydraulic connection.

5. A vibration damper according to claim 4, wherein said constriction in said first hydraulic connection extends substantially entirely from said port valve to said at least one connection opening.

6. A vibration damper according to claim 5, wherein said constriction comprises an axially extending portion of said intermediate tube of reduced radial dimension having a radially inward extending wall portion forming said reduced radial dimension, said hydraulic fluid exerting a hydraulic force on said radially inward extending wall portion in a direction substantially parallel to said longitudinal axis of said pressure tube and in a direction toward said piston rod guide member.

7. A vibration damper according to claim 3, said vibration damper additionally comprising a body closing said second pressure tube end, said body extending radially outward from said second pressure tube end to said intermediate tube, and said body comprising at least a portion of said port valve.

8. A vibration damper according to claim 7, wherein said port valve comprises a valve ring member, wherein said body comprises a support surface, said support surface comprising an annular surface formed on said body and extending radially, and wherein said valve ring member abuts and is supported by said support surface.

9. A vibration damper according to claim 3, said vibration damper additionally comprising:

a piston rod guide member closing said first pressure tube end of said pressure tube;

a base member closing said second pressure tube end;

a locking ring member abutting said base member; and said intermediate tube being disposed and restrained between said piston rod guide member and said locking ring member.

10. A vibration damper according to claim 3, wherein at least one of said first damping valve arrangement and said additional damping valve arrangement comprises an adjustable damping valve.

11. A vibration damper according to claim 3, said vibration damper additionally comprising a body closing said second pressure tube end, said body extending radially outward from said second pressure tube end to said first hydraulic connection, and said body comprising at least a portion of said port valve.

12. A vibration damper according to claim 2, wherein said pressure tube comprises at least one connection opening, said at least one connection opening is configured and disposed to connect said first working chamber to said space of said passageway, said port valve comprises a slotted ring member, said slotted ring member being disposed abutting the interior surface of said pressure tube and at least partially covering said at least one connection opening.

13. A vibration damper according to claim 2, said vibration damper additionally comprising a piston rod guide member closing said first pressure tube end of said pressure tube, said piston rod extending through said piston rod guide member, and at least one channel formed in said piston rod guide member and connecting said first working chamber with said first hydraulic connection, and wherein said port valve comprises an annular spring washer member at least partially covering said at least one channel formed in said piston rod guide member, said annular spring washer member being biasingly flexible in an axial direction substantially parallel to said longitudinal axis of said pressure tube.

14. A vibration damper according to claim 13, wherein said annular spring washer member is clamped between said piston rod guide member and said pressure tube.

15. A vibration damper according to claim 14, wherein said piston rod guide member comprises a radial guide surface surrounding said longitudinal axis of said pressure tube, and wherein said annular spring washer member is positioned by said radial guide surface.

16. A vibration damper according to claim 2, wherein said port valve comprises a non-return valve.

17. A vibration damper, said vibration damper comprising:
- a pressure tube having a longitudinal axis;
- a piston disposed within said pressure tube and dividing said pressure tube into an first working chamber and a second working chamber;
- said pressure tube having a first pressure tube end closing said first working chamber and a second pressure tube end closing said second working chamber;
- a piston rod connected to said piston and extending through said first working chamber and said first pressure tube end to a position exterior of said pressure tube;
- said piston being displaceable within said pressure tube along said longitudinal axis of said pressure tube;
- a hydraulic fluid contained in both of said first and second working chambers;
- an equalization chamber for containing a reservoir of said hydraulic fluid;
- a first damping valve arrangement provided on said piston for providing a first damped flow path through said piston at least from said first working chamber to said second working chamber;
- an intermediate tube;
- said intermediate tube being disposed substantially concentric to said pressure tube;
- a first hydraulic connection between said first working chamber and said equalization chamber;
- said first hydraulic connection comprising a passageway for said hydraulic fluid;
- said intermediate tube and said pressure tube being disposed to form a space;
- said passageway of said first hydraulic connection comprising said space formed by said intermediate tube and said pressure tube;
- a port valve disposed in said first hydraulic connection between said first working chamber and said equalization chamber, said port valve having a substantially greater resistance to flow through said first hydraulic connection in a direction from said first working chamber toward said equalization chamber than to flow through said first hydraulic connection in a direction from said equalization chamber toward said first working chamber;
- said port valve being disposed to form at least a part of a wall of said space;
- a second hydraulic connection between said second working chamber and said equalization chamber;
- a directional flow valve arrangement positioned within said second hydraulic connection for permitting flow from said equalization chamber to said second working chamber and for substantially restraining flow from said second working chamber to said equalization chamber;
- a third hydraulic connection between said second working chamber and said equalization chamber;
- at least one additional damping valve arrangement, said at least one additional damping valve arrangement being positioned within said third hydraulic connection, said at least one additional damping valve arrangement providing an additional damped flow path from said second working chamber to said equalization chamber; and
- said at least one additional damping valve arrangement being dimensioned to provide a volumetric flow through said third hydraulic connection, upon said piston being advanced into said pressure tube so as to compress said hydraulic fluid contained in said lower working chamber; said volumetric flow ranging between:
  - a maximum volumetric flow equal to the volume of said hydraulic fluid displaced from said second working chamber by said advancement of said piston into said pressure tube; and
  - a minimum volumetric flow equal to the volume of said hydraulic fluid displaced by said advancement of said piston rod into said pressure tube.

18. A vibration damper, said vibration damper comprising:
- a pressure tube having a longitudinal axis;
- a piston being disposed within said pressure tube and dividing said pressure tube into a first working chamber and a second working chamber;
- said pressure tube having a first pressure tube end closing said first working chamber and a second pressure tube end closing said second working chamber;
- a piston rod being connected to said piston and extending through said first working chamber and said first pressure tube end to a position exterior of said pressure tube;
- said piston being displaceable within said pressure tube along said longitudinal axis of said pressure tube;
- a hydraulic fluid being contained in both of said first and second working chambers;
- an equalization chamber to contain a reservoir of said hydraulic fluid;
- a first damping valve arrangement being disposed on said piston to provide a first damped flow path through said piston at least from said first working chamber to said second working chamber;
- an intermediate tube;
- said intermediate tube being disposed substantially concentric to said pressure tube;
- a first hydraulic connection being disposed between said first working chamber and said equalization chamber;
- said intermediate tube and said pressure tube being disposed to form a space;
- said first hydraulic connection comprising said space formed by said intermediate tube and said pressure tube;

said space comprising a plurality of walls;

said plurality of walls comprising two sidewalls;

said two sidewalls being disposed to be aligned with said longitudinal axis of said pressure tube;

said plurality of walls comprising an end wall;

said end wall being disposed substantially transverse to said two sidewalls;

a port valve being disposed in said first hydraulic connection between said first working chamber and said equalization chamber;

said port valve having a substantially greater resistance to flow through said first hydraulic connection in a direction from said first working chamber toward said equalization chamber than to flow through said first hydraulic connection in a direction from said equalization chamber toward said first working chamber;

said port valve being disposed to form at least a part of one wall of said plurality of walls;

a second hydraulic connection being disposed between said second working chamber and said equalization chamber;

a directional flow valve arrangement being positioned within said second hydraulic connection to permit flow from said equalization chamber to said second working chamber and to substantially restrain flow from said second working chamber to said equalization chamber;

a third hydraulic connection being disposed between said second working chamber and said equalization chamber; and at least one additional damping valve arrangement;

said at least one additional damping valve arrangement being positioned within said third hydraulic connection;

said at least one additional damping valve arrangement providing an additional damped flow path from said second working chamber to said equalization chamber.

19. The vibration damper according to claim 18, wherein:

said pressure tube comprises at least one opening;

said at least one opening is configured to permit passage of said hydraulic fluid between said space of said first hydraulic connection and said first working chamber;

said port valve comprises a ring member;

said ring member is disposed adjacent to said at least one opening; and said ring member is configured and disposed to form a portion of one of said two sidewalls of said space.

20. The vibration damper according to claim 19, wherein:

said pressure tube has a first surface and a second surface disposed opposite to said first surface;

said first surface of said pressure tube being disposed to face said intermediate tube; and said ring member being disposed to contact said second surface of said pressure tube to cover said at least one opening to limit passage of said hydraulic fluid from said first working chamber to said space of said first hydraulic connection.

* * * * *